Figures 1, 2:
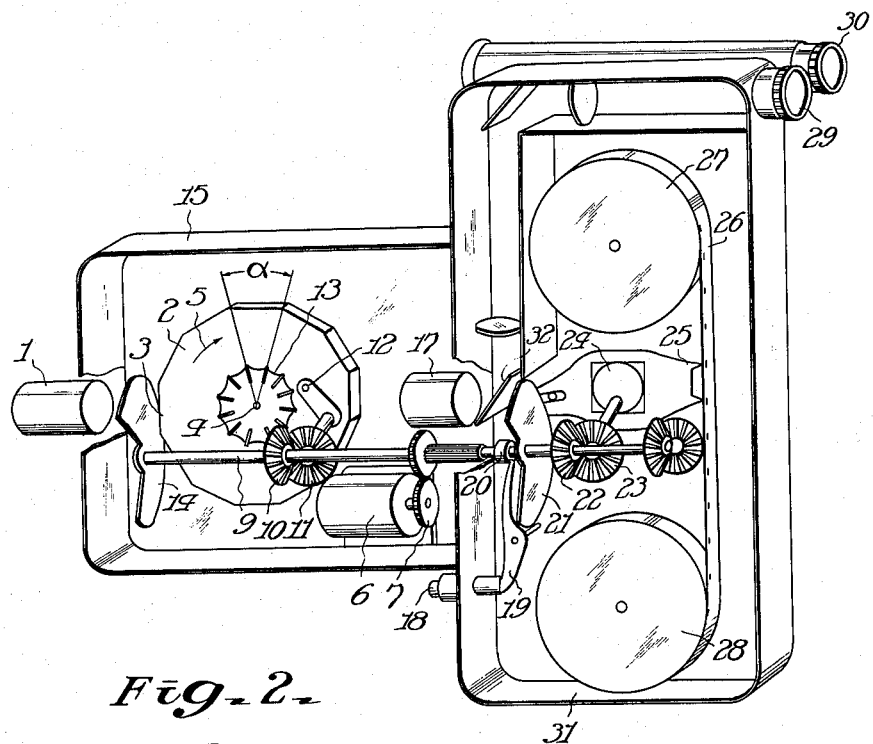

July 5, 1966  TAKASHI KUMAGAI  3,259,040
CAMERA APPARATUS HAVING A TEMPORARY MEMORY MECHANISM
Filed April 3, 1963

3,259,040
CAMERA APPARATUS HAVING A TEMPORARY MEMORY MECHANISM
Takashi Kumagai, 231–8 Kinuta-cho, Setagaya-ku, Tokyo-to, Japan
Filed Apr. 3, 1963, Ser. No. 270,420
Claims priority, application Japan, May 12, 1962, 37/18,648
1 Claim. (Cl. 95—11)

This invention relates to image-taking apparatuses such as still cameras, cinematographic cameras, and television cameras. More particularly the invention relates to a new camera apparatus having a temporary memory mechanism whereby a time delay in the picture imaging operation is afforded so that a complete record of sudden events can be imaged continuously in an economical manner.

In general, when it is desired to photographically capture a sudden, unexpected change in an object to be imaged by means of a camera system such as a still camera, cinematographic camera, and a television camera, it has heretofore been extremely difficult to select the appropriate time of picture-taking operation and to record, in a complete manner, the unexpected sudden change thereof. Especially in cinematographic photography, when a sudden change is to be recorded with continuity from the state prior to the change, it has been necessary to continue the camera operation throughout the entire period during which the sudden change is expected. For this reason the consumption of the recording medium such as film and tape has been unavoidably tremendous, and in many cases, moreover, the important portion of the total quantity of recording medium consumed has been only a minute fraction.

It is a prime object of the present invention to eliminate the above-stated difficulty by providing in a camera apparatus a temporary memory mechanism consisting of a ring-shaped memory retaining member, through which picture recording is accomplished in an indirect manner, whereby a time delay in the picture-recording operation is secured.

The precise nature, principle, and details of the invention will be best understood by reference to the following description of a preferred embodiment of the invention, taken in conjunction with the accompanying drawing, in which the same members are indicated by the same numerals and in which: FIG. 1 is a perspective view, with parts cut away, showing the internal construction of the embodiment of the invention as applied to continuous photography and cinematographical photography; and FIG. 2 is a perspective view for showing the main parts of a camera provided with a device for promoting elimination of embodiment of residual images.

Referring to the drawing, the camera apparatus shown has a first camera lens 1 through which the incident light is directed to form an image on a surface 3 which is coated with a fluorescent paint and forms one lateral face of a memory retaining or image-retaining member 2 of a prismatic form with $n$ lateral faces. Each of the faces is painted with a fluorescent paint and is an image-retaining surface. The memory retaining member 2 is driven intermittently in rotation through an angle $\alpha$ for each intermittent motion, in the direction of the arrow 5, by a revolving pin 12 whch engages with and drives a slotted wheel 13 fixed to the member 2, the pin 12 and the slotted wheel 13 forming an intermittent transmission mechanism of the so-called Geneva type. The arm on which the pin 12 is fixed is, in turn, driven by a motor 6 through gears 7 and 8, a main shaft 9, and bevel gears 10 and 11.

Accordingly, the images formed by the incident light entering through the first camera lens 1 also move in succession, together with the memory retaining member 2, in the arrow direction 5. The residual light characteristic of the fluorescent paint surfaces 3 is so suitably selected that a residual image of ample brightness is retained on each of the said surfaces until that surface arrives at a position $3a$ confronting a second camera lens 17, and the said residual image is extinguished and disappears by the time the said surface moves further past the position $3a$ and arrives at the position 3 immediately behind the first camera lens 1.

A first rotating shutter blade 14, which is disposed between the first camera lens 1 and the memory retaining memory member 2, is fixed to one end of the main shaft 9. A driving coupling member 16, which is engageable by a driven coupling member 20, is fixed to the other end of the main shaft 9. The driven coupling member 20 is fixed in rotation with respect to a shaft which is coaxial with the main shaft 9 and has a second rotating shutter blade 21. The coupling member 20 is caused to engage with the coupling member 16 by pressing a shutter button 18 which actuates a lever 19, the coupling mechanism being so adapted that, at the time of the engagement of the coupling members, the phase of the second rotating shutter blade 21 always coincides with that of the first rotating shutter blade 14 and, accordingly, is maintained in a suitable coupled relationship with respect to the intermittent rotational movement of the memory retaining member 2. Thus, each residual image which arrives at the position $3a$ is projected by the second camera lens 17 onto a film 26, the exposure time being suitably determined by the second rotating shutter blade 21.

On one hand, a portion of the incident light from the second camera lens 17 is divided out by a semi-transparent mirror 32 so that the residual image $3a$ can be viewed through a second finder 29. Accordingly, if the angle of rotation per second of the memory retaining member 2 is $\theta$, the image $3a$ observed through the second finder 29 is the image of the object to be photographed in the state $n\alpha/2\theta$ seconds prior to the state of the said object observed through the first finder 30 and is projected and recorded on the film 26. When a fluorescent paint containing as its essential element ZnS:Cu type fluorescent material is used, it is possible to manufacture the fluorescent paint the residual time of which is from about 1/30 of a second as in the case of television braun tube to about one second or more as in the case of radar braun tube. Accordingly, when the fluorescent paint such as described above is used, a relatively bright and clear residual image can be obtained and an appropriate disappearance of the image can be obtained.

Thus, as will be readily understood from the above description, the present invention provides a camera apparatus wherein a margin of preparatory time of $n\alpha/2\theta$ seconds from the time the shutter button 18 is pressed after confirmation of a sudden change in the object as viewed through the first finder 30 to the time the image corresponding to the sudden change is recorded on the film. Therefore, it is possible to obtain a complete record from the very beginning of the sudden change.

The memory retaining member 2 may, of course, be of cylindrical shape or of ribbon shape provided that it is in the form of a loop. It will also be apparent that, by providing means whereby the memory retaining means is removed from the optical path or means whereby the light path is changed and projecting the light rays from the object to be photographed directly into the camera lens for photography, it is possible to use the camera apparatus of this invention in a manner similar to that of an ordinary camera. From a standpoint of the residual light characteristic of the memory retaining member, if necessary, it may be possible to provide a residual image eliminating device which radiates ultrared rays, through a filter 34, from a lamp 33.

The shaft 9 when coupled to the shutter 21 by the clutch members drives a pair of bevel gears 22, 23 for actuating a cam 24 operating a drive member 25, shown diagrammatically in FIG. 1 and in detail in FIG. 2, reciprocably intermittently engaging with the film 26 on reels 27, 28 through a pair of ears engageable with holes spaced longitudinally on the film. Those skilled in the art will readily see that the mechanism provided drives the film 26 step-by-step to allow exposure of the images selected to be photographed as the member 2 is driven step-by-step.

Although this invention has been described with respect to a particular embodiment thereof, it is not to be so limited as changes and modifications can be made therein which are within the full intended scope of the invention, as defined by the appended claim.

What is claimed is:

A camera comprising, a movable, driven image-retaining member having a plurality of image-retaining surfaces each comprising a material capable of rendering visible latent images from modulated radiant energy having said latent images therein and received on said surfaces, said material having the characteristic of retaining the images visible for a limited time, means comprising first lens means for receiving modulated radiant energy having latent images therein and transmitting said latent images to said image-retaining member, means driving said surface-retaining member in operation to position said image-retaining surfaces successively in a respective first position for receiving said modulated radiant energy from said first means thereby to receive said latent images and render them visible and to another position in which the individual surfaces are not in said first position and said images are visible, photographic mechanism comprising a shutter, means comprising clutch means operable selectively for coupling and uncoupling at will said shutter and said means driving said image-retaining member to effect photographic exposures of selected ones of said surfaces having visible images thereon when at said another position, and including means to view said images on said surfaces thereby to permit an operator to select which surfaces having residual visible images are to be subjected to photographic exposure.

References Cited by the Examiner
UNITED STATES PATENTS

| | | | |
|---|---|---|---|
| 1,724,572 | 8/1929 | Geisen | 88—24 X |
| 2,755,715 | 7/1956 | Tuttle | 95—14 |
| 3,107,138 | 10/1963 | Le Massena | 346—109 |

JOHN M. HORAN, *Primary Examiner.*

NORTON ANSHER, *Examiner.*